B. VENTRICE.

WATER INTAKE FOR POWER BOATS.

APPLICATION FILED SEPT. 19, 1913.

1,090,584. Patented Mar. 17, 1914.

Attest:
Edw. L. Tolson
H. L. Alden

Inventor:
Bartolo Ventrice,
by Spear, Middleton, Donaldson & Spear
Att'ys.

UNITED STATES PATENT OFFICE.

BARTOLO VENTRICE, OF COLLINSVILLE, CALIFORNIA.

WATER-INTAKE FOR POWER-BOATS.

1,090,584. Specification of Letters Patent. Patented Mar. 17, 1914.

Application filed September 19, 1913. Serial No. 790,747.

*To all whom it may concern:*

Be it known that I, BARTOLO VENTRICE, a citizen of the United States, residing at Collinsville, Solano county, California, have invented certain new and useful Improvements in Water-Intakes for Power-Boats, of which the following is a specification.

My invention relates to an improvement in water-intakes for power boats. Heretofore it has been customary to have the open end of the water intake pipes covered with a flaring part or an elbow so as to utilize the speed of the boat forward to force the water up the pipe. But this arrangement has been found to be objectionable particularly in rough water, where the boat pitches, as when the boat falls from a wave the water is pushed to each side by the keel and the presence of a flared part over the pipe prevents a constant supply of water to the intake pipe. Again, in reversing the boat, the flared part or elbow prevents the water being supplied to the intake as it faces the wrong way. This has become such a serious difficulty in localities near rough water that the centrifugal pump now used on boat engines is falling into disfavor for the reason of the usually inconstant water supply and the plunger pump is taking its place. The latter style of pump has the disadvantage of robbing the engine of a great deal more power while the centrifugal pump is more desirable in every way but requires a constant supply of water. I aim, therefore, to utilize a centrifugal pump and to assure a constant supply of water through the intake, my intake pipe being of such construction and so located as to overcome the difficulties heretofore experienced and give a constant supply in rough water and in reversing.

Figure 1:
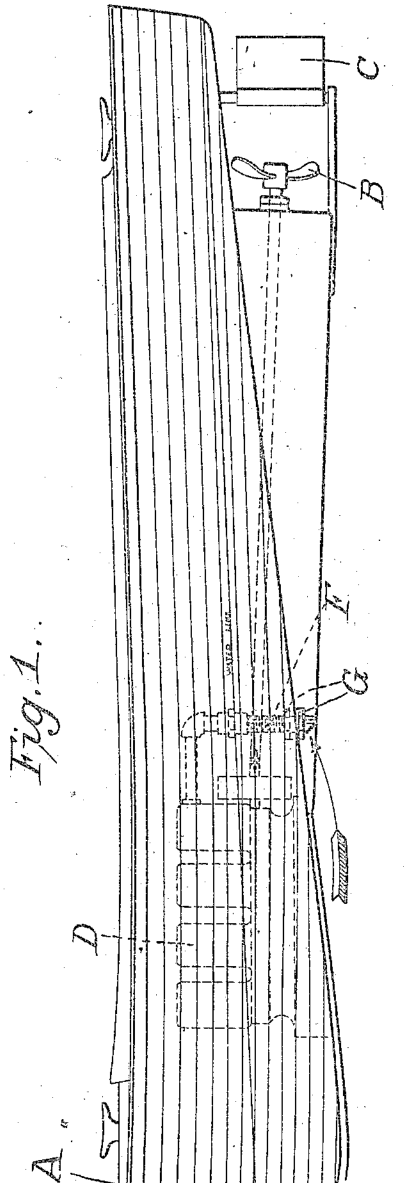
Figure 2:
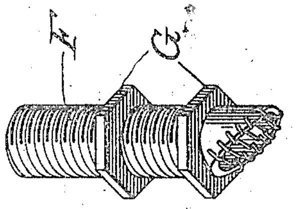

In Figure 1 of the drawing I have shown a boat in outline with my invention applied thereto. Fig. 2 is a detail view.

In this drawing the boat of any ordinary or improved construction is shown at A, the propeller at B, the rudder at C, the engine at D. My water intake is a pipe cut off diagonally and projecting through the hull of the boat slightly, being threaded at F and having nuts G, G, on said threaded part and adapted to clamp the pipe in place. The diagonal face of the pipe is to the front and has a screen arranged on its open end. In operation it works equally well in going forward or backward. Going forward under ordinary conditions the water is easily forced in by the movement of the boat. In rough water the pitching of the boat gives the open face of the intake exactly the opposite direction taken by the water so that the prompt entrance of the latter follows. In going backward, the propeller tends to force the water toward the bow of the boat and the round surface of the pipe divides this current naturally and so easily that, for the moment, it tends to lose its immediate direction and surges around and into the pipe and is in that moment drawn in.

I have found in practice that my improvement will furnish a constant supply of water under all conditions and that this is not true of any intake of which I have knowledge.

The screen is a most important factor in securing the best results as by the use of it a more perfect supply of water is secured, the screen assuring an intake of water practically uniform throughout the area of the opening.

Claim:

In combination in a motor boat having a pump for water circulation, an intake pipe of uniform diameter throughout, its lower end projecting through the hull of the boat and having its face cut off at an angle and screened, the inclined part facing the bow and the rounded part facing the stern, substantially as described.

In testimony whereof I affix my signature in presence of two witnesses.

BARTOLO VENTRICE.

Witnesses:

EMIL EMMINGTON,

JOSEPH CIRTONINI.